(12) United States Patent
Sopel et al.

(10) Patent No.: US 10,864,810 B2
(45) Date of Patent: Dec. 15, 2020

(54) BOWSTRING-TRUSS BATTERY CRADLE SYSTEM

(71) Applicants: Grzegorz Sopel, Windsor (CA); Brett Giem, Oxford, MI (US); Surya Yerva, Troy, MI (US); Bryan Masternak, Royal Oak, MI (US)

(72) Inventors: Grzegorz Sopel, Windsor (CA); Brett Giem, Oxford, MI (US); Surya Yerva, Troy, MI (US); Bryan Masternak, Royal Oak, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 16/394,636

(22) Filed: Apr. 25, 2019

(65) Prior Publication Data

US 2020/0338991 A1 Oct. 29, 2020

(51) Int. Cl.
*B60K 1/04* (2019.01)
*H01M 2/10* (2006.01)
*B60L 50/61* (2019.01)
*B60L 50/60* (2019.01)

(52) U.S. Cl.
CPC ............. *B60K 1/04* (2013.01); *B60L 50/61* (2019.02); *B60L 50/66* (2019.02); *H01M 2/1077* (2013.01); *H01M 2/1083* (2013.01)

(58) Field of Classification Search
CPC .......... B60L 50/61; B60L 50/66; B60L 50/64; B60L 50/50; H01M 2/1077; H01M 2/1083; H01M 2/1072; H01M 2/1007; B60K 1/04
USPC ....................................... 180/68.5
See application file for complete search history.

(56) References Cited

U.S. PATENT DOCUMENTS

| 5,570,558 | A  | * | 11/1996 | Persson ...................... B60J 5/00 |
|---|---|---|---|---|
|  |  |  |  | 296/146.6 |
| 8,708,080 | B2 | * | 4/2014 | Lee .......................... B60L 50/66 |
|  |  |  |  | 180/68.5 |
| 10,377,216 | B2 | * | 8/2019 | Hitz ......................... B60K 1/04 |

(Continued)

FOREIGN PATENT DOCUMENTS

DE 102012021857 A1 5/2014

OTHER PUBLICATIONS

International Search Report dated Jul. 13, 2020 for International Application No. PCT/US2020/029480, International Filing Date Apr. 23, 2020.

(Continued)

*Primary Examiner* — John D Walters
(74) *Attorney, Agent, or Firm* — Ralph E Smith

(57) ABSTRACT

A vehicle battery cradle has first and second side beams. Each side beam has a first and second end. The first and second side beams are spaced from one another and positioned substantially parallel to one another. A center beam, with a first and second end, is positioned between the first and second side beams. A cross beam is secured with a first end of the first, second and center beams. The cross beam, with a first and second end, is substantially transverse to the first, second and center beams. A truss is coupled with the cross beam. The truss stabilizes the cradle. The second ends of the first and second side beams include a mechanism to secure the cradle with the vehicle body. The first and second ends of the cross beam include a mechanism to secure the cradle with the vehicle.

18 Claims, 3 Drawing Sheets

(56) References Cited

U.S. PATENT DOCUMENTS

2013/0277130 A1   10/2013  Katou et al.
2019/0255928 A1*  8/2019  Erlacher ................ B60L 50/66

OTHER PUBLICATIONS

Written Opinion dated Jul. 13, 2020 for International Application No. PCT/US2020/029840, International Filing Date Apr. 23, 2020.

* cited by examiner

BOWSTRING-TRUSS BATTERY CRADLE SYSTEM

FIELD

The present disclosure relates to vehicles and, more particularly, to a rear battery cradle system.

BACKGROUND

Battery cradle systems within a vehicle that supports high voltage batteries for hybrid variance can be found in the rear cargo portion of the car. This system is designed to support a mass of up to 400 lbs. in a controlled manner. This is accomplished while accommodating the surrounding architecture, vehicle or wheelhouse, liftgate, seating, c-ring, rear floor, etc. Unoptimized designs require numerous securing points and add substantial weight. Thus, it would be desirable to have a lightweight cradle with a few mounting points.

SUMMARY

The present disclosure provides a battery cradle for a vehicle comprising a first and second side beams. Each side beam has a first and second end. The first and second side beams are spaced from one another and are positioned substantially parallel to one another. A center beam, having a first and second end, is positioned between the first and second side beams. A cross beam is secured with the first end of the first, second and center beams. The cross beam, has a first and second end. The cross beam is substantially transverse to the first, second and center beams. A truss is coupled with the cross beam. The truss stabilizes the cradle. The second ends of the first and second side beams include a mechanism to enable securement of the cradle with a vehicle body. The first and second ends of the cross beam include a mechanism to enable securement of the cradle with the vehicle. The truss has an elongated D shape with at least one reinforcement member. A mount is coupled with each end of the cross beam. The mount is previously referred to as a mechanism to enable securement of the cradle to the vehicle. A stop is positioned on the second end of the first and second side beams to secure to the battery. The cross beam includes a top cross member and a bottom cross member with the truss secured between the top cross member and the bottom cross member.

The present disclosure further provides a vehicle with a rear floor deck to receive a battery comprising a first and second side beams. Each side beam has a first and second end. The first and second side beams are spaced from one another and are positioned substantially parallel to each other. A center beam, having a first and second end, is positioned between the first and second side beams. A cross beam is secured with the first end of the first, second and center beams. The cross beam, has a first and second end. The cross beam is substantially transverse to the first, second and center beams. A stabilizing truss is coupled with the cross beam. The truss stabilizes the cradle. The second ends of the first and second side beams include a mechanism to enable securement of the cradle with the vehicle body. The first and second ends of the cross beam include a mechanism to enable securement of the cradle with the vehicle. The truss has an elongated D shape with at least one reinforcement member. A mount is coupled with each end of the cross beam. A stop is positioned on the second end of the first and second side beams. The cross beam includes a top cross member and a bottom cross member with the truss secured between the top cross member and the bottom cross member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
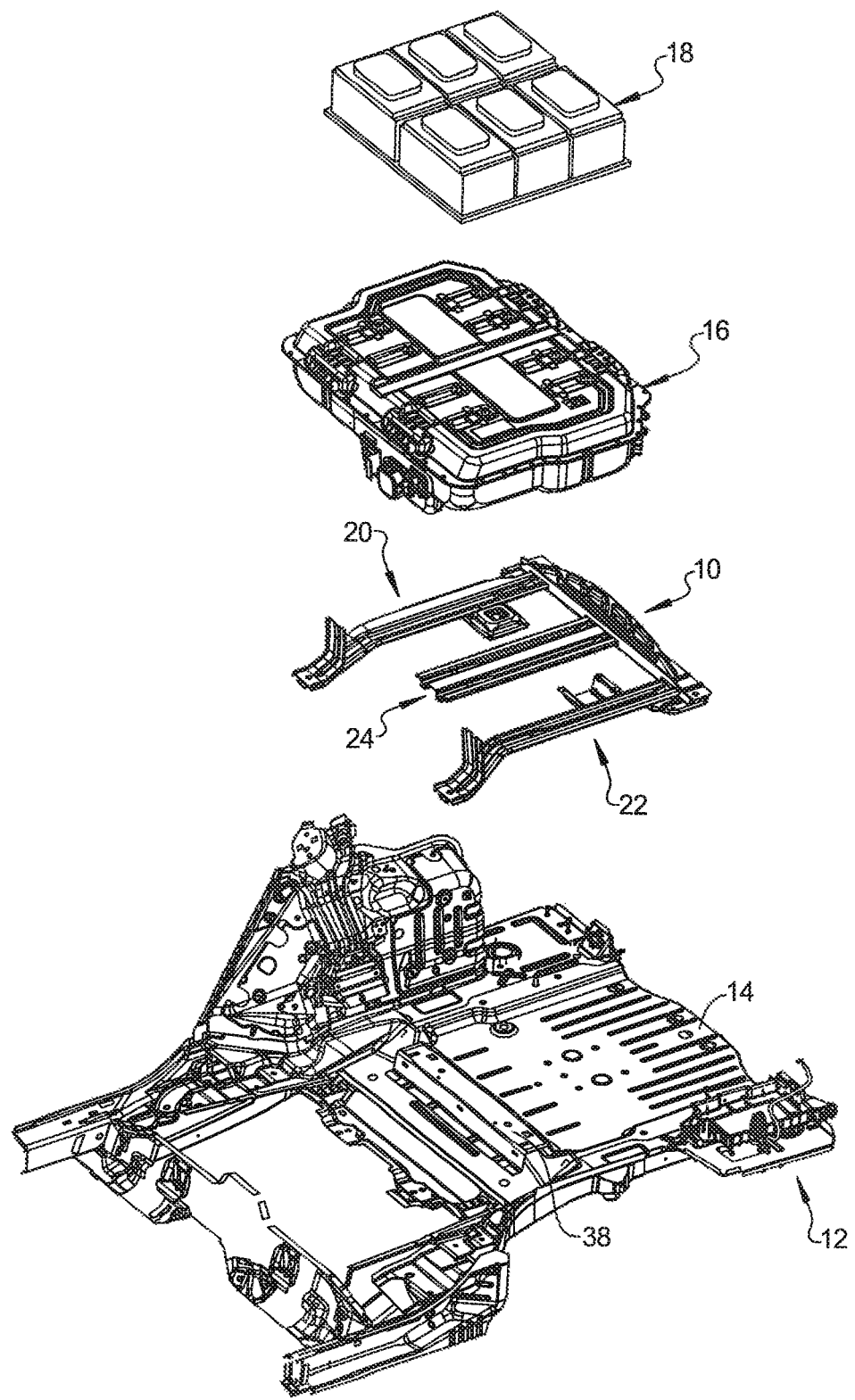
FIG. 1 is a perspective exploded view of a partial vehicle with a battery cradle.
Figure 2:
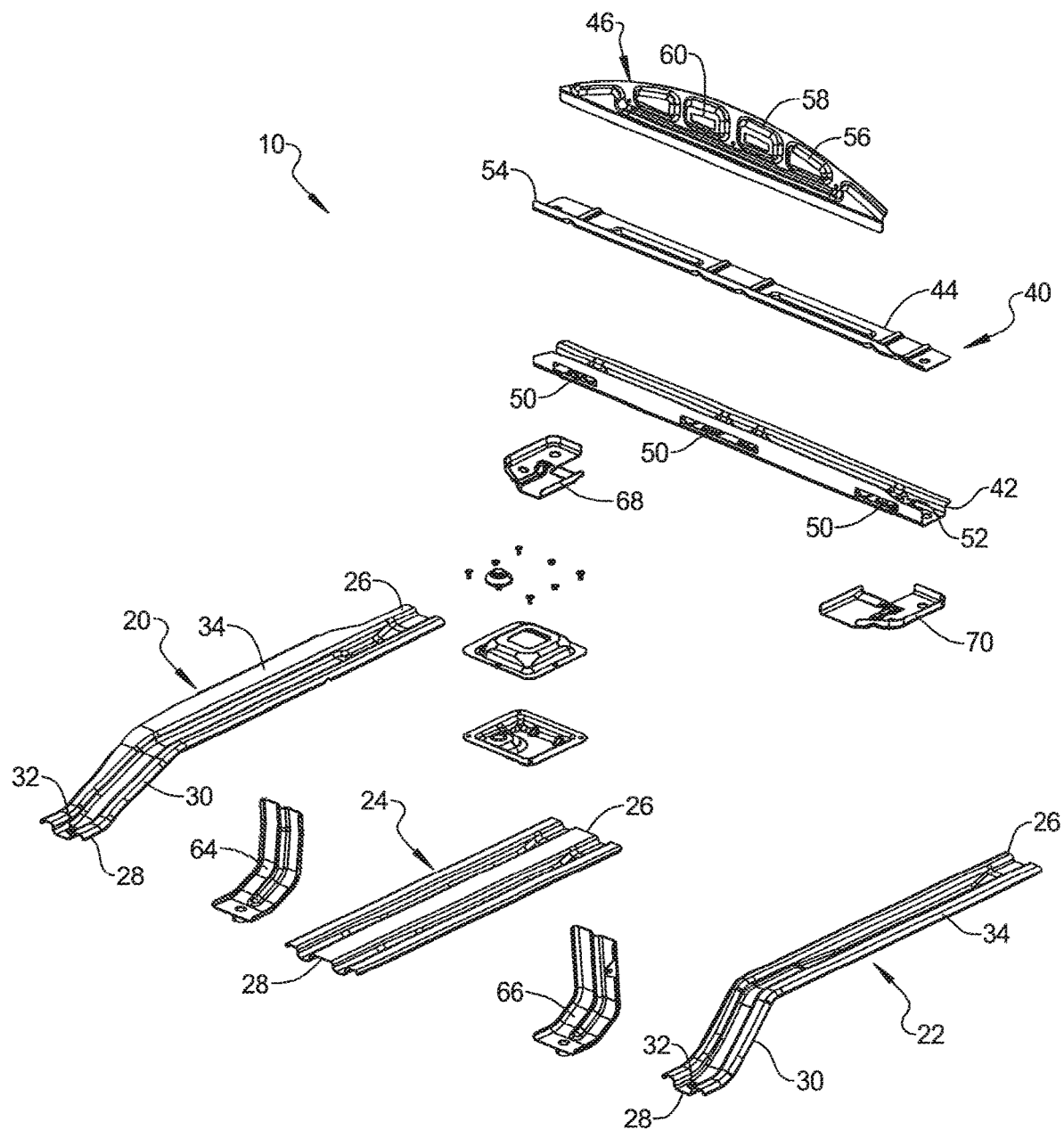
FIG. 2 is an exploded view of the cradle of FIG. 1.
Figure 3:
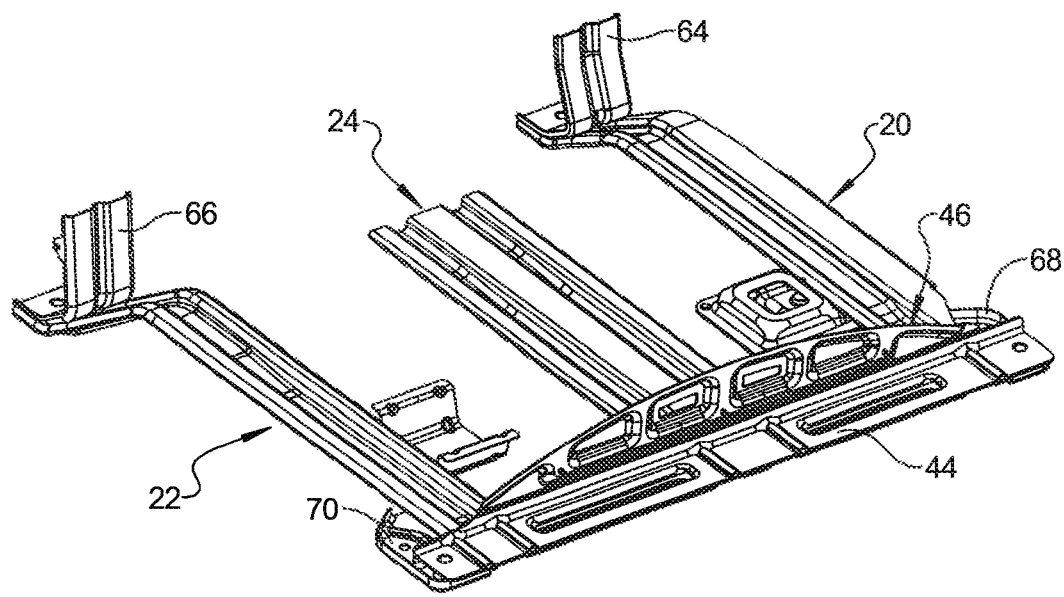
FIG. 3 is a rear perspective view of the cradle.
Figure 4:
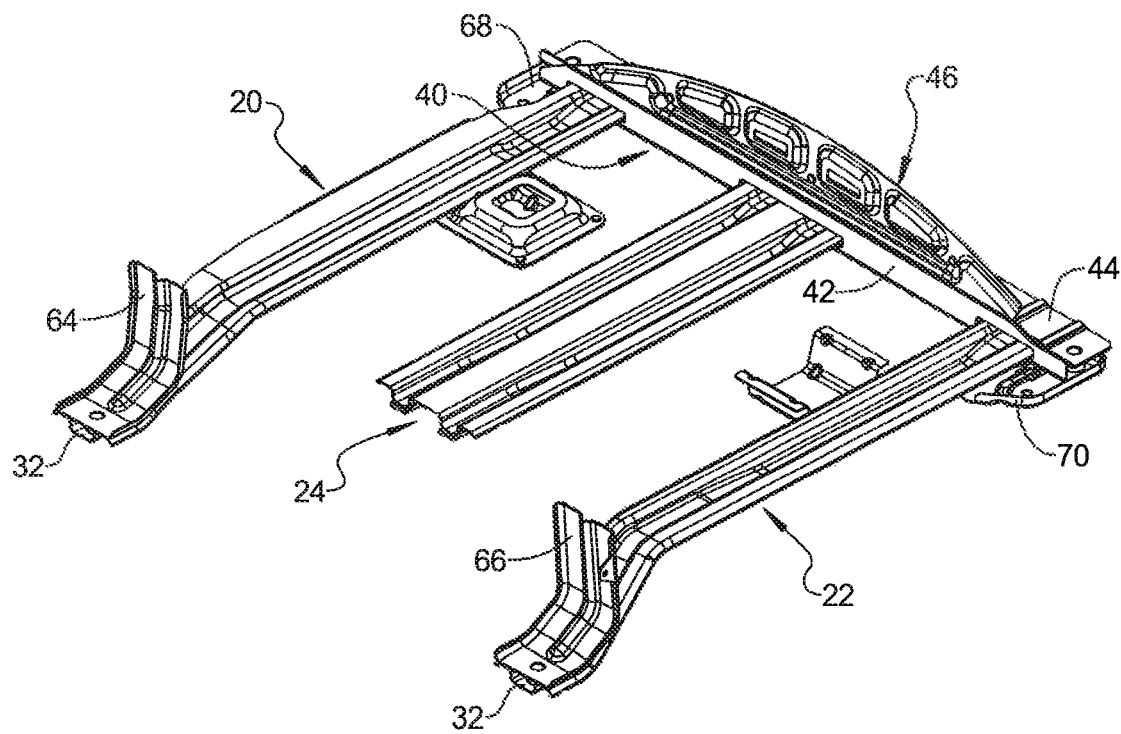
FIG. 4 is a front perspective view of the cradle.

Turning to the figures, a battery cradle is illustrated and designated with the reference numeral 10. The cradle is fit into a rear cargo space of the vehicle 12. The cradle is generally secured to the rear floor deck 14. A battery casing 16, with battery cells 18, is positioned onto the cradle 10.

The cradle 10 includes a first side beam 20, a second side beam 22 and a center beam 24. The first, second and center beams 20, 22, 24 are generally parallel to one another. The beams include a first end 26 and second end 28. The side beams 20, 22 include an angled portion 30 that extends toward the second ends 28. The second ends 28, on the side beams 20, 22, include a securement mechanism 32. The securement mechanism 32 may be a hole or the like that receives a bolt that secures the second end 28 of the side members 20, 22 to the vehicle floor 14. The side beams 20, 22 include a portion 34 that has substantially the same length as the center beam. The portion 38 rests on the axle cross beam 38.

A cross beam 40 is secured to the first ends 26 of the first, second and center beams 20, 22, 24. The cross beam 40 includes a bottom member 42, a top member 44 and a truss 46. The bottom member 42 has an overall U shape in cross section and has a leg that includes apertures 50 that receive the first end 26 of the first, second and center beams 20, 22, 24. The first, second and center beams 20, 22, 24 are secured with the bottom cross member 42 by welding or the like. The top cross member 44 is positioned over top of web of the bottom cross member 42. The bottom member and top member include flanges 52, 54. The truss 46 is positioned between the flanges 52, 54 and welded with the bottom and top members 42, 44.

The truss 46 has an overall elongated D shape or bow string configuration. The truss 46 includes at least one preferably a plurality of stamped reinforcement members 56, 58. The members 56 are stamped into the truss 46 and do not include an aperture. The members 58 are stamped into the truss 46 and extend through and include an aperture 60 that is present in the reinforcement member 58. The truss 46 provides stability for the entire system. The truss 46 enables the cradle 10 to be manufactured from stamped metal parts. Utilizing stamped metal parts as disclosed provides a lightweight system that mounts the battery packs, weighing up to 400 lbs. The weight of the cradle 10 is approximately 20 lbs. This saves additional weight in the vehicle.

A pair of battery stops 64, 66 are positioned on the second end 28 of the first and second side beams 20, 22. The stops 64, 66 have an overall L shape and provide a stop for the battery casing prohibiting sliding of the battery 16 on the cradle 10. Additionally, the truss 46 provides a stop at the rear of the battery 16 fixing the battery 16 in position between the stops 64, 66 and the truss 46, A pair of mounts 68, 70 is also secured to the bottom cross member 42. The mounts 68, 70 enable fasteners, such as a bolt, to pass through the cross beam 40 through the mounts 68,70 to secure the rear of the cradle 10 with the vehicle floor 14. Thus, the cradle 10 is secured at four positions to the vehicle floor 14. This is substantially less than current designs that include many more fasteners securing the cradle to the floor.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A battery cradle for a vehicle comprising:
   a first and second side beam, each having a first and second end, the first and second side beams are spaced from one another and positioned substantially parallel to one another;
   a center beam, having a first and second end, positioned between the first and second side beams;
   a cross beam secured with a first end of the first, second and center beams, the cross beam, having a first and second end, substantially transverse to the first, second and center beams,
   a mount is coupled with each end of the cross beam;
   a truss coupled with the cross beam, the truss stabilizing the cradle; and
   the second ends of the first and second side beams including a mechanism to enable securement of the cradle with a vehicle body and the first and second ends of the cross beam including a mechanism to enable securement of the cradle with a vehicle.

2. The battery cradle of claim 1, wherein the truss has an elongated D shape.

3. The battery cradle of claim 1, wherein the truss includes at least one reinforcement member.

4. The battery cradle of claim 1, further comprising a first and second battery stop positioned on the second end of the first and second side beams.

5. The battery cradle of claim 1, wherein the cross beam includes a top cross member and bottom cross member.

6. The battery cradle of claim 5, wherein the truss is secured between the top cross member and the bottom cross member.

7. A vehicle with a rear floor deck for receiving a battery comprising:
   a first and second side beam, each having a first and second end, the first and second side beams are spaced from one another and positioned substantially parallel to one another;
   a center beam, having a first and second end, positioned between the first and second side beams;
   a cross beam secured with a first end of the first, second and center beams, the cross beam, having a first and second end, substantially transverse to the first, second and center beams, the cross beam includes a top cross member and bottom cross member;
   a truss coupled with the cross beam, the truss stabilizing the cradle; and
   the second ends of the first and second side beams including a mechanism to enable securement of the cradle with the vehicle body and the first and second ends of the cross beam including a mechanism to enable securement of the cradle with the vehicle.

8. The vehicle with a rear floor deck for receiving a battery of claim 7, wherein the truss has an elongated D shape.

9. The vehicle with a rear floor deck for receiving a battery of claim 7, wherein the truss includes at least one reinforcement member.

10. The battery cradle of claim 7, wherein a mount is coupled with each end of the cross beam.

11. The vehicle with a rear floor deck for receiving a battery of claim 7, further comprising a first and second battery stop positioned on the second end of the first and second side beams.

12. The vehicle with a rear floor deck for receiving a battery of claim 7, wherein the truss is secured between the top cross member and the bottom cross member.

13. A battery cradle for a vehicle comprising:
    a first and second side beam, each having a first and second end, the first and second side beams are spaced from one another and positioned substantially parallel to one another;
    a center beam, having a first and second end, positioned between the first and second side beams;
    a cross beam secured with a first end of the first, second and center beams so that the first, second and center beams cantilever from the cross beam, the cross beam, having a first and second end, substantially transverse to the first, second and center beams,
    a truss coupled with the cross beam, the truss stabilizing the cradle; and
    the second ends of the first and second side beams including a mechanism to enable securement of the cradle with a vehicle body and the first and second ends of the cross beam including a mechanism to enable securement of the cradle with a vehicle.

14. The battery cradle of claim 13, wherein the truss has an elongated D shape.

15. The battery cradle of claim 13, wherein the truss includes at least one reinforcement member.

16. The battery cradle of claim 13, wherein a mount is coupled with each end of the cross beam.

17. The battery cradle of claim 13, wherein the cross beam includes a top cross member and bottom cross member.

18. The battery cradle of claim 17, wherein the truss is secured between the top cross member and the bottom cross member.

* * * * *